United States Patent
Lomayev et al.

(10) Patent No.: US 10,305,570 B2
(45) Date of Patent: May 28, 2019

(54) APPARATUS, SYSTEM AND METHOD OF DUAL CARRIER MODULATION WITH FIRST AND SECOND SPATIAL STREAMS

(71) Applicant: INTEL CORPORATION, Santa Clara, CA (US)

(72) Inventors: Artyom Lomayev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/043,517

(22) Filed: Jul. 24, 2018

(65) Prior Publication Data

US 2019/0020390 A1   Jan. 17, 2019

Related U.S. Application Data

(63) Continuation of application No. 15/084,746, filed on Mar. 30, 2016, now Pat. No. 10,056,960.

(60) Provisional application No. 62/278,601, filed on Jan. 14, 2016.

(51) Int. Cl.
*H04B 7/0413* (2017.01)
*H04B 7/06* (2006.01)

(52) U.S. Cl.
CPC ......... *H04B 7/068* (2013.01); *H04B 7/0413* (2013.01)

(58) Field of Classification Search
CPC ... H04L 27/2626; H04L 27/2649; H04L 1/04; H04L 1/06; H04L 5/0023; H04L 27/0008;
(Continued)

(56) References Cited

U.S. PATENT DOCUMENTS 10,056,960 B2   8/2018   Lomayev et al.
2011/0019775 A1  1/2011  Ruscitto et al.
(Continued)

FOREIGN PATENT DOCUMENTS

WO   2009016573   2/2009

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications,Part 11: Wireless LAN Medium Access Control (MAC) and Physical Layer (PHY) Specifications, Part 11: Wireless LAN Medium Access Control (MAC) and Physical Layer (PHY) Specifications, Mar. 29, 2012, 2793 pages.
(Continued)

*Primary Examiner* — Rahel Guarino
(74) *Attorney, Agent, or Firm* — Shichrur & Co.

(57) ABSTRACT

For example, a wireless station may be configured to modulate a plurality of data bit sequences into a plurality of constellation points in first and second spatial streams according to a DCM, a data bit sequence of the plurality of data bit sequences includes a sequence of a plurality of data bits, modulating the plurality of data bit sequences includes modulating the sequence of the plurality of data bits into a first constellation point in the first spatial stream and a second constellation point in the second spatial stream, the second constellation point is a complex conjugate of the first constellation point; and to transmit an OFDM transmission over a wireless communication channel in a frequency band above 45 GHz, the OFDM transmission based on the plurality of constellation points in the first and second spatial streams.

23 Claims, 4 Drawing Sheets

(58) Field of Classification Search
CPC .............. H04L 1/0058; H04L 1/02; H04L 2025/03426; H04L 5/0046; H04L 1/0057; H04L 25/03159; H04L 5/0092; H04L 27/2637; H04L 27/2639; H04L 27/2653; H04L 1/0606; H04L 27/2617; H04L 5/003; H04B 1/71637; H04B 1/71635; H04B 7/02; H04B 7/0413; H04B 7/0452; H04B 7/068; H04W 84/12
See application file for complete search history.

(56) References Cited

U.S. PATENT DOCUMENTS

| | | | |
|---|---|---|---|
| 2011/0129032 A1* | 6/2011 | Batra | H04L 27/2602 375/298 |
| 2012/0114054 A1 | 5/2012 | Waters et al. | |
| 2014/0270010 A1 | 9/2014 | Koo et al. | |
| 2016/0249332 A1 | 8/2016 | Xin et al. | |
| 2017/0207838 A1 | 7/2017 | Lomayev et al. | |

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2016/066520, dated Apr. 5, 2017, 14 pages.

Tien Hoa Nguyen et al., 'A scheme of Dual Carrier Modulation with Soft-decoding for MB-OFDM MIMO systems', 2011 International Conference on Advanced Technologies for Communications (ATC), Sep. 26, 2011, pp. 220-223, 4 pages.

Office Action for U.S. Appl. No. 15/084,746, dated Dec. 22, 2017, 22 pages.

Notice of Allowance for U.S. Appl. No. 15/084,746, dated Apr. 24, 2018, 8 Pages.

International Preliminary Report on Patentability for International Application No. PCT/US2016/066520, dated Jul. 26, 2018, 11 pages.

* cited by examiner

APPARATUS, SYSTEM AND METHOD OF DUAL CARRIER MODULATION WITH FIRST AND SECOND SPATIAL STREAMS

CROSS REFERENCE

This application claims the benefit of and priority from U.S. Provisional Patent Application No. 62/278,601 entitled "Apparatus, System and Method of Communicating According to a Transmit Space-Frequency Diversity Scheme", filed Jan. 14, 2016, the entire disclosure of which is incorporated herein by reference.

TECHNICAL FIELD

Embodiments described herein generally relate to communicating according to a transmit space-frequency diversity scheme.

BACKGROUND

A wireless communication network in a millimeter-wave (mmWave) band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
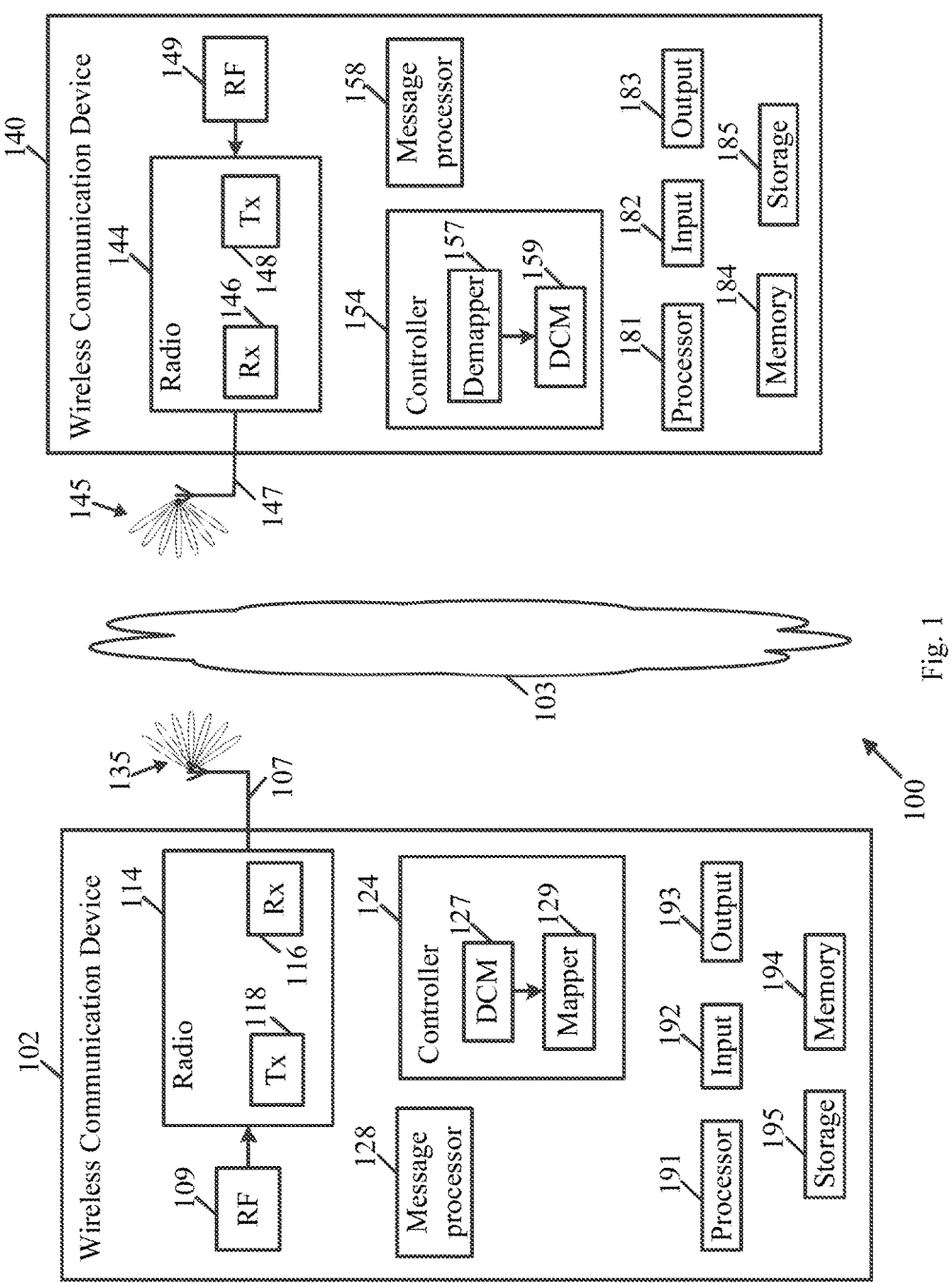
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE*802.11*ac*-2013 (*"IEEE P*802.11*ac*-2013*, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); IEEE 802.11*ad* (*"IEEE P*802.11*ad*-2012*, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High*

*Throughput in the 60 GHz Band", 28 Dec.* 2012); *IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing WiFi Alliance (WFA) Peer-to-Peer (P2P) specifications (including *WiFi P2P technical specification, version* 1.5, *Aug.* 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, wireless communication devices 102 and/or 140 may include a mobile device or a non-mobile, e.g., a static, device.

For example, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel in a directional frequency band. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations (STA), e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, radios 114 and/or 144 may include, or may be associated with, a plurality of directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, device 140 may include one or more, e.g., a plurality of, RF chains 149 connected to, and/or associated with, antennas 147.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multi-In-Multi-Out (MIMO) communication, for example, for communicating over the NG60 and/or EDMG networks, e.g., over an NG60 or an EDMG frequency band.

Some demonstrative embodiments may be implemented, for example, as part of a new standard in a mmWave band, e.g., a 60 GHz frequency band or any other directional band, for example, as an evolution of an *IEEE* 802.11*ad standard*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide WiFi connectivity in a 60 GHz band.

Some demonstrative embodiments may enable, for example, to significantly increase the data transmission rates defined in the *IEEE* 802.11*ad specification*, for example, from 7 Gbps, e.g., up to 30 Gbps, or to any other data rate, which may, for example, satisfy growing demand in network capacity for new coming applications.

Some demonstrative embodiments may be implemented, for example, to allow increasing a transmission data rate, for example, by applying Multiple Input Multiple Output (MIMO) and/or channel bonding techniques.

In some demonstrative embodiments, the *IEEE* 802.11*ad*-2012 *Specification* may be configured to support a Single User (SU) system, in which a Station (STA) may transmit frames to a single STA at a time.

Some demonstrative embodiments may enable, for example, communication in one or more use cases, which may include, for example, a wide variety of indoor and/or outdoor applications, including but not limited to, for example, at least, high speed wireless docking, ultra-short range communications, 8K Ultra High Definition (UHD) wireless transfer at smart home, augmented reality headsets and high-end wearables, data center inter-rack connectivity, mass-data distribution or video on demand system, mobile offloading and multi-band operation, mobile front-hauling, and/or wireless backhaul.

In some demonstrative embodiments, a communication scheme may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, Single User (SU) techniques, and/or Multi User (MU) MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, devices 102 and/or 140 may be configured to communicate MIMO communications over the mmWave wireless communication band.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, devices 102 and/or 140 may be configured to implement one or more techniques, which may, for example, enable to support communications over a MIMO communication channel, e.g., a SU-MIMO channel between two mmWave STAs, or a MU-MIMO channel between a STA and a plurality of STAs.

In some demonstrative embodiments, devices 102 and/or 140 may be configured to communicate according to a diversity scheme for MIMO transmission, e.g., as described below.

In some demonstrative embodiments, devices 102 and/or 140 may be configured to communicate according to a space-frequency diversity scheme, which may be configured, for example, for OFDM MIMO, e.g., as described below.

In some demonstrative embodiments, the space-frequency diversity scheme may be implemented for example, for communication in accordance with an IEEE 802.11ay standard, and/or any other standard, protocol and/or specification.

In some demonstrative embodiments, the space-frequency diversity scheme may be configured, for example, for a 2×2 MIMO configuration, e.g., as described below. In other embodiments, the space-frequency diversity scheme may be configured to support any other MIMO configuration.

In some demonstrative embodiments, devices 102 and/or 140 may be configured to communicate according to a space-frequency transmit diversity scheme for OFDM modulation, which may be configured, for example, for 2×2 MIMO communication, e.g., as described below. In other embodiments, a space-frequency transmit diversity scheme for OFDM modulation may be configured, for example, for any other type of MIMO communication, e.g., any other N×M MIMO communication, e.g., wherein N is equal or greater than 2, and M is equal or greater than 2.

In some demonstrative embodiments, devices 102 and/or 140 may be configured to communicate according to a space-frequency transmit diversity scheme, which may utilize one or more Dual Carrier Modulation (DCM) techniques, e.g., as described below.

In some demonstrative embodiments, devices 102 and/or 140 may be configured to communicate according to a space-frequency transmit diversity scheme, which may utilize one or more Phase Shift Keying (PSK) modulation schemes, e.g., as described below. In other embodiments, devices 102 and/or 140 may be configured to communicate according to a space-frequency transmit diversity scheme, which may utilize any other additional or alternative modulation scheme, e.g., any modulation which is based or not based on PSK.

In some demonstrative embodiments, devices 102 and/or 140 may be configured to communicate according to a space-frequency transmit diversity scheme, which may utilize, for example, Staggered quadrature phase-shift keying (SQPSK) and/or Quadrature Phase Shift Keying (QPSK) dual carrier modulation schemes, e.g., as described below. In other embodiments, devices 102 and/or 140 may be configured to communicate according to a space-frequency transmit diversity scheme, which may utilize any other additional or alternative dual carrier modulation scheme, and/or multicarrier modulation scheme.

In some demonstrative embodiments, the space-frequency transmit diversity scheme may be configured to use SQPSK and/or QPSK modulations, which may be compatible with "legacy" dual carrier modulations, for example, in accordance with an *IEEE 802.11ad Standard* and/or any other Standard or protocol.

For example, some standards, for example, an *IEEE 802.11ad Standard*, may support Single-In-Single-Out (SISO) dual carrier SQPSK and QPSK modulations mapping subcarriers to different sub-bands, for example, to exploit a frequency diversity property in frequency selective channels.

In some demonstrative embodiments, the SQPSK and/or QPSK dual carrier modulations may exploit two subcarriers in an OFDM signal spectrum to carry data, and, accordingly, may allow extracting a diversity gain in frequency selective channels. This may be achieved, for example, by mapping data symbols to the different parts of the signal spectrum, e.g., to different sub-bands.

For example, the SQPSK and/or QPSK dual carrier modulations may be able to provide substantially the same performance as single carrier modulations, for example, in a frequency flat channel.

In some demonstrative embodiments, the space-frequency transmit diversity scheme described herein may allow exploiting space diversity gain, for example, in addition to exploiting a gain due to frequency selectivity.

In some demonstrative embodiments, space diversity gain may be achieved by transmitting a first tone in a first spatial stream and a second tone in a second spatial stream, e.g., as described below.

In some demonstrative embodiments, the ability to exploit the space diversity gain may provide, for example, at least enhanced reliability of data delivery, for example, even in a case when data in one of the spatial streams is partially or even completely lost, for example, due to blockage, e.g., human blockage, and/or due to any other reason. Such a situation may occur, for example, for signal transmission in the 60 GHz band.

In some demonstrative embodiments, the space-frequency transmit diversity scheme may be configured, for example, by extending a legacy frequency diversity mapping scheme, e.g., in accordance with an *IEEE 802.11ad Standard* and/or any other standard. For example, SQPSK and/or QPSK OFDM Physical Layer (PHY) DCMs may be defined for robust operation under frequency selective channel conditions, e.g., as described below.

In some demonstrative embodiments, the SQPSK/QPSK symbols may be mapped to data subcarriers in the OFDM signal spectrum. For example, a pair of symbols may be mapped to a pair of tones in first and second halves of a signal band. For example, mapping to the first half of the signal band may be defined by a tone index k, and mapping to the second half of the signal band may be defined by a permutation index P(k), e.g., as described below.

In some demonstrative embodiments, devices 102 and/or 140 may be configured to communicate according to a space-frequency transmit diversity scheme, which may define a mapping of subcarriers to a plurality of spatial streams, e.g., to two spatial streams or any other number of spatial streams, for example, for OFDM MIMO.

In some demonstrative embodiments, the dual carrier space-frequency transmit diversity scheme described herein may be configured to provide space diversity, for example, in addition to a frequency diversity provided by a SISO scheme.

In some demonstrative embodiments, a space-frequency transmit diversity scheme may be configured to extend an applicability of a dual carrier mapping scheme to MIMO communications, for example, by mapping subcarriers to different sub-bands and to different spatial streams, e.g., as described below.

In some demonstrative embodiments, the space-frequency transmit diversity scheme may be advantageous, for example, by at least providing additional space diversity, and/or protection of communication of data, for example, even in a case when one of the spatial streams is partially or even completely lost, blocked or corrupt.

In some demonstrative embodiments, controller 124 may be configured to cause, trigger, and/or control a wireless station implemented by device 102 to generate and transmit a MIMO transmission to at least one other station, for example, a station implemented by device 140, e.g., as described below.

In some demonstrative embodiments, controller 124 may be configured to cause, trigger, and/or control the wireless station implemented by device 102 to generate a plurality of spatial streams in a frequency domain based on data, which may be represented by encoded data bits, e.g., as described below.

In some demonstrative embodiments, controller 124 may be configured to cause, trigger, and/or control the wireless station implemented by device 102 to modulate a plurality of data bit sequences corresponding to the data to be transmitted into a plurality of data blocks in the frequency domain, e.g., as described below.

In some demonstrative embodiments, controller 124 may include, operate as, and/or perform the functionality of a DCM module 127, which may be configured to modulate the plurality of data bit sequences into the plurality of data blocks according to a dual carrier modulation, e.g., as described below.

In some demonstrative embodiments, DCM module 127 may be configured to exploit a pair of tones in an OFDM signal spectrum to carry constellation points, e.g., as described below.

In some demonstrative embodiments, DCM module 127 may be configured to modulate a data bit sequence of the plurality of data bit sequences into first and second consecutive symbols in a data block of the plurality of data blocks, e.g., as described below.

In some demonstrative embodiments, DCM module 127 may be configured to modulate the data bit sequences according to an SQPSK DCM, e.g., as described below.

For example, DCM module 127 may be configured to map a data bit sequence including two data bits to first and second symbols including first and second respective QPSK constellation points, e.g., as described below.

For example, DCM module 127 may be configured to map a data bit sequence including two data bits to a first QPSK constellation point and a second constellation point, which may be a complex conjugate of the first constellation point, e.g., as described below.

In some demonstrative embodiments, DCM module 127 may be configured to generate a pair of QPSK constellation points, denoted $(s_0, s_1)$, for example, based on a data bit sequence including two encoded bits, denoted $(c_0, c_1)$, e.g., as follows:

$$s_0 = \frac{1}{\sqrt{2}}((2c_0 - 1) + j(2c_1 - 1)) \quad (1)$$

$$s_1 = \frac{1}{\sqrt{2}}((2c_0 - 1) - j(2c_1 - 1))$$

For example, DCM module 127 may be configured to determine the point $s_1$ by simple conjugation of the point $s_0$, e.g., $s_1 = s_0^*$, which may correspond, for example, to a repetition 2× of the second constellation point.

In some demonstrative embodiments, DCM module 127 may be configured to modulate the data bit sequences according to a QPSK DCM, e.g., as described below.

For example, DCM module 127 may be configured to map a data bit sequence including four data bits into the first and second symbols, e.g., as described below.

For example, DCM module 127 may be configured to map first and second data bits of the four data bits to a first QPSK constellation point, and to map third and fourth data bits of the four data bits to a second QPSK constellation point, e.g., as described below.

For example, DCM module 127 may be configured to map the first and second QPSK constellation points to first and second 16 Quadrature Amplitude Modulation (16QAM) constellation points, for example, such that the first data subcarrier may include the first 16QAM constellation point, and the second data subcarrier may include the second 16QAM constellation point, e.g., as described below.

In some demonstrative embodiments, DCM module 127 may be configured to generate the pair of QPSK constellation points $(s_0, s_1)$, for example, based on a data bit sequence including 4 encoded bits, denoted $(c_0, c_1, c_2, c_3)$, for example, in two operations, e.g., as described below.

For example, in a first operation, the encoded bits $(c_0, c_1, c_2, c_3)$ may be converted into two QPSK constellation points, e.g., as follows:

$$x_0 = \frac{1}{\sqrt{2}}((2c_0 - 1) + j(2c_2 - 1)) \quad (2)$$

$$x_1 = \frac{1}{\sqrt{2}}((2c_1 - 1) + j(2c_3 - 1))$$

For example, in a second operation, the pair of constellation points $(s_0, s_1)$ may be obtained, for example, by multiplying the vector $(x_0, x_1)$ by a matrix, e.g., as follows:

$$\begin{bmatrix} s_0 \\ s_1 \end{bmatrix} = \frac{1}{\sqrt{5}} \begin{bmatrix} 1 & 2 \\ -2 & 1 \end{bmatrix} \times \begin{bmatrix} x_0 \\ x_1 \end{bmatrix} \quad (3)$$

In some demonstrative embodiments, the constellation points $(s_0, s_1)$ may lie in a 16QAM constellation grid. However, this is ay be more than just a repetition 2×, but rather encoding in place, e.g., since $s_0 \neq s_1$.

In other embodiments, DCM module 127 may be configured to modulate the data bit sequences into the data blocks according to any other dual carrier or multi-carrier modulation scheme.

In some demonstrative embodiments, controller 124 may include, operate as, and/or perform the functionality of a mapper 129, which may be configured to map the plurality of data blocks to a plurality of spatial streams, for example, according to a spatial diversity mapping scheme, e.g., as described below.

In some demonstrative embodiments, mapper 129 may be configured to map the first symbol to a first data subcarrier in a first sub-band of a signal band in a first spatial stream of the plurality of spatial streams, and to map the second symbol to a second data subcarrier in a second sub-band of the signal band in a second spatial stream of the plurality of spatial streams, e.g., as described below.

In some demonstrative embodiments, mapper 129 may be configured to map first and second data blocks of the plurality of data blocks to the first and second spatial streams, for example, by mapping first and second symbols of the first data block to the first and second subcarriers, and mapping first and second symbols of the second data block to a third data subcarrier and a fourth data subcarrier, e.g., as described below. For example, the third data subcarrier may be in the second sub-band in the first spatial stream, and the fourth data subcarrier may be in the first sub-band in the second spatial stream, e.g., as described below.

In some demonstrative embodiments, the first sub-band may include a first half of the signal band, and the second sub-band may include a second half of the signal band. In other embodiments, the first and second sub-bands may include any other portions of the signal band.

In some demonstrative embodiments, mapper 129 may be configured to map the first symbol, including a k-th symbol, in the data block to the first data subcarrier, including a k-th data subcarrier in the first sub-band; and to map the second symbol, including a (k+1)-th symbol of the data block, to the second data subcarrier, including a P(k)-th data subcarrier in the second sub-band, wherein P(k) is a predefined permutation of k, e.g., as described below.

In some demonstrative embodiments, mapper 129 may be configured to determine the permutation P(k) according to a Static Tone Pairing (STP) permutation.

In some demonstrative embodiments, mapper 129 may be configured to determine the permutation P(k) according to a Dynamic Tone Pairing (DTP) permutation.

In other embodiments, mapper 129 may be configured to determine the permutation P(k) according to any other permutation mechanism and/or scheme.

In some demonstrative embodiments, an STP mapping mode may be applied, for example, for PHY header transmission.

In some demonstrative embodiments, the STP mapping mode may be applied for Physical layer Service Data Unit (PSDU) transmission, for example, if a header field includes a Tone Pairing Filed=0.

In other embodiments, the STP mode may be applied according to any other criteria.

In some demonstrative embodiments, the STP mapping mode may include mapping symbol pairs, e.g., SQPSK or QPSK symbol pairs, using the indexes k and P(k). For example, k-th repeated symbol may be mapped to the second half of the signal spectrum with the index the P(k)=168+k, e.g., k=0:167 for a size of 168 subcarriers.

In some demonstrative embodiments, a DTP mapping mode may be applied for PSDU transmission, for example, if the header field includes the Tone Pairing Filed=1. In other embodiments, the DTP mode may be applied according to any other criteria.

In some demonstrative embodiments, the DTP mapping mode may include dividing a symbol stream, e.g., a SQPSK or QPSK symbol stream, into a plurality of groups of symbols, for example, 42 groups of 4 symbols, e.g., for a size of 168 subcarriers, or any other number of groups of any other number of symbols, and/or for any other size.

In some demonstrative embodiments, the DTP mapping may include mapping the groups of 4 symbols, e.g., continuously, to the first half of the spectrum.

In some demonstrative embodiments, each group of 4 symbols may be repeated in the second half of the spectrum, for example, by applying interleaving on a group basis.

In some demonstrative embodiments, group interleaving may be defined based on an array, for example, a GroupPairIndex array, e.g., in the range of 0 to 41, for example, with respect to 42 groups, or any other array.

In some demonstrative embodiments, a repeated symbol index in the second half of the signal spectrum may be determined, for example, as follows:

$$P(k) = 168 + 4 \cdot \text{GroupPairIndex}\left(\left\lfloor \frac{k}{4} \right\rfloor\right) + \text{mod}(k, 4), k = 0:167 \quad (4)$$

In some demonstrative embodiments, the DCM may allow, for example, to avoid complete data symbol loss, for example, even in case of a deep notch in a frequency response, e.g., due to the data duplication in the second half of the frequency band.

In some demonstrative embodiments, the STP mapping approach may at least provide, for example, a maximal equal space between the tones carrying the same information.

In some demonstrative embodiments, the DTP mapping may allow, for example, at least adaptive pairing of tones, for example, based on channel state information feedback.

In some demonstrative embodiments, lost tones, e.g., with low SNR, in the second sub-band of the frequency band may be, for example, grouped with strong tones, e.g., with high SNR, in the first sub-band of the frequency band. For example, medium quality tones may be grouped with each other.

In some demonstrative embodiments, this adaptive approach for pairing of tones may provide, for example, equal protection of symbols, e.g., even under hostile frequency selectivity conditions.

In some demonstrative embodiments, controller 124 may be configured to cause, trigger, and/or control the wireless station implemented by device 102 to transmit a MIMO transmission based on the plurality of spatial streams, e.g., as described below.

In some demonstrative embodiments, controller 124 may be configured to cause, trigger, and/or control the wireless station implemented by device 102 to transmit the plurality of spatial streams via a plurality of directional antennas. For example, controller 124 may be configured to cause, trigger, and/or control the wireless station implemented by device 102 to transmit the first spatial stream via a first antenna of antennas 107, and to transmit the second spatial stream via a second antenna of antennas 107.

In some demonstrative embodiments, the MIMO transmission may include a 2×2 MIMO transmission, e.g., as described below. In other embodiments, the MIMO transmission may include any other N×M MIMO transmission.

In some demonstrative embodiments, the MIMO transmission may include an OFDM MIMO transmission including a plurality of OFDM symbols based on the plurality of spatial streams, e.g., as described below.

In some demonstrative embodiments, controller 124 may be configured to cause, trigger, and/or control the wireless station implemented by device 102 to transmit the MIMO transmission over directional frequency band, for example, a DMG band.

Figure 2:
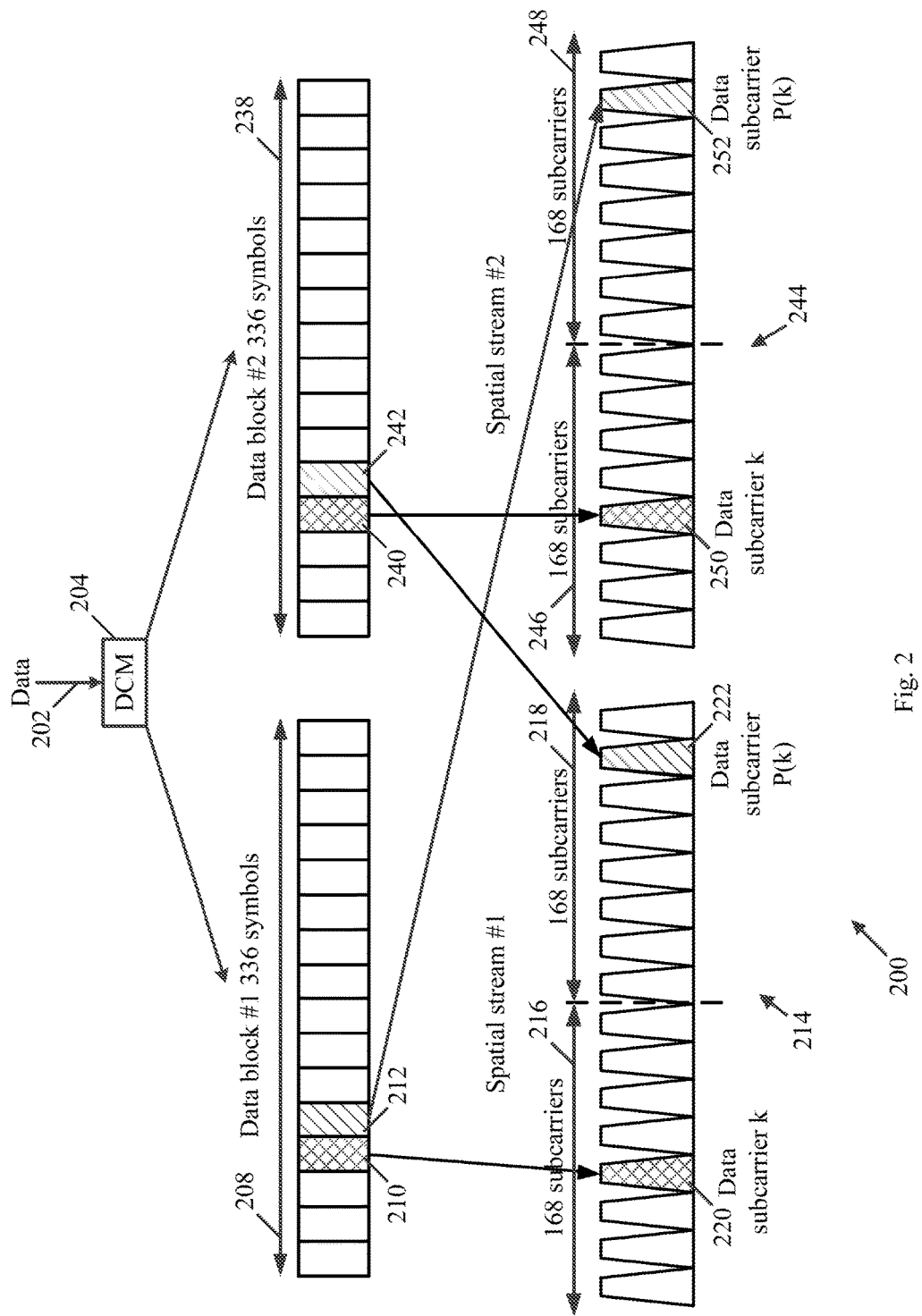
FIG. 2 is a schematic illustration of a space-frequency mapping scheme, in accordance with some demonstrative embodiments.

Reference is made to FIG. 2, which schematically illustrates a space-frequency mapping scheme 200, in accordance with some demonstrative embodiments. For example, a wireless station, e.g., a wireless station implemented by device 102 (FIG. 1), may be configured to map data to data subcarriers of a plurality of spatial streams according to mapping scheme 200, e.g., as described below. In one example, controller 124 (FIG. 1) may be configured to cause, trigger, and/or control the wireless station implemented by device 102 (FIG. 1) to map data to be transmitted in a MIMO transmission according to space-frequency mapping scheme 200.

In some demonstrative embodiments, space-frequency mapping scheme 200 may be configured to support dual carrier modulations for 2×2 MIMO, e.g., to support an implementation in accordance with an *IEEE 802.11ay Specification*.

In some demonstrative embodiments, space-frequency diversity mapping scheme 200 may be configured based on a dual carrier modulation scheme 204, e.g., as described below.

In some demonstrative embodiments, the dual carrier modulation scheme 204 may be configured to modulate data 202 into a plurality of data blocks including a plurality of symbols.

In some demonstrative embodiments, the dual carrier modulation scheme 204 may be configured to modulate a plurality of data bit sequences of data 202 into the plurality of data blocks, for example, by modulating a data bit sequence of the plurality of data bit sequences into first and second consecutive symbols in a data block of the plurality of data blocks, e.g., as described below.

In some demonstrative embodiments, as shown in FIG. 2, the dual carrier modulation scheme 204 may be configured to modulate the data bit sequences of data 202 into a plurality of blocks, e.g., including a first data bock 208 and a second data block 238, having a predefined number of data symbols, e.g., 336 data symbols or any other number of data symbols.

In some demonstrative embodiments, as shown in FIG. 2, the dual carrier modulation scheme 204 may be configured to modulate a data bit sequence of the plurality of data bit sequences into first and second consecutive symbols in a data block of the plurality of data blocks.

For example, as shown in FIG. 2, the dual carrier modulation scheme 204 may be configured to modulate a plurality of data bit sequences into a plurality of pairs of consecutive symbols of data block 208, e.g., including the pair of consecutive symbols 210 and 212, which may correspond to a data bit sequence.

For example, as shown in FIG. 2, the dual carrier modulation scheme 204 may be configured to modulate another plurality of data bit sequences into a plurality of pairs of consecutive symbols of data block 238, e.g., e.g., including the pair of consecutive symbols 240 and 242, which may correspond to another data bit sequence.

In some demonstrative embodiments, the dual carrier modulation scheme 204 may be configured to modulate the plurality of data bit sequences according to an SQPSK DCM scheme, e.g., as described above. For example, the pair of symbols 210 and 212 may include the respective pair of QPSK constellation points ($s_0, s_1$) corresponding to a two-bit data bit sequence; and the pair of symbols 240 and 242 may include the respective pair of QPSK constellation points ($s_0, s_1$) corresponding to another two-bit data bit sequence, e.g., as described above.

In some demonstrative embodiments, the dual carrier modulation scheme 204 may be configured to modulate the plurality of data bit sequences according to a QPSK DCM scheme, e.g., as described above. For example, the pair of symbols 210 and 212 may include the respective pair of 16QAM constellation points ($s_0, s_1$) corresponding to a four-bit data bit sequence; and the pair of symbols 240 and 242 may include the respective pair of 16QAM constellation points ($s_0, s_1$) corresponding to another four-bit data bit sequence, e.g., as described above.

In some demonstrative embodiments, as shown in FIG. 2, the space-frequency diversity mapping scheme 200 may be configured to extend the dual carrier modulation scheme with a spatial diversity, e.g., between a plurality of spatial streams, e.g., two streams as shown in FIG. 2.

In some demonstrative embodiments, space-frequency mapping scheme 200 may be configured to map symbols of first data block 208 and symbols of second data block 238 to subcarriers of a first spatial stream 214 and subcarriers of a second spatial stream 244, e.g., as described below.

In some demonstrative embodiments, a signal band of the spatial streams 214 and 244 may be divided into first and second sub-bands.

In some demonstrative embodiments, for example, as shown in FIG. 2, spatial streams 214 and 244 may have a signal band including 336 subcarriers (tones).

In some demonstrative embodiments, as shown in FIG. 2, for example, a first sub-band 216 of a signal band of the first spatial stream 214 may include a first subset of the subcarriers, e.g., including 168 subcarriers, and a second sub-band 216 of the signal band of the first spatial stream 214 may include a second subset of the subcarriers, e.g., including 168 subcarriers.

In some demonstrative embodiments, as shown in FIG. 2, for example, a first sub-band 246 of a signal band of the second spatial stream 244 may include a first subset of the subcarriers, e.g., including 168 subcarriers, and a second sub-band 246 of the signal band of the second spatial stream 244 may include a second subset of the subcarriers, e.g., including 168 subcarriers.

In some demonstrative embodiments, as shown in FIG. 2, space-frequency mapping scheme 200 may be configured to map a first symbol of a pair of consecutive symbols of data block 208, e.g., symbol 210, to a first data subcarrier 220 in the first sub-band 216 of the first spatial stream 214, and to map a second symbol of the pair of consecutive symbols of data block 208, e.g., symbol 212, to a second data subcarrier 248 in the second sub-band 248 of the second spatial stream 244.

In some demonstrative embodiments, as shown in FIG. 2, space-frequency mapping scheme 200 may be configured to map a first symbol of a pair of consecutive symbols of data block 238, e.g., symbol 240, to a first data subcarrier 250 in the first sub-band 246 of the first spatial stream 244, and to map a second symbol of the pair of consecutive symbols of data block 238, e.g., symbol 242, to a second data subcarrier 222 in the second sub-band 218 of the first spatial stream 214.

In some demonstrative embodiments, space-frequency mapping scheme 200 may be configured to map a pair of consecutive symbols including a k-th symbol and a (K+1)-th symbol of a data block, e.g., data block 208 or data block 238, to a first subcarrier in spatial stream 214 and a second subcarrier in spatial stream 244, e.g., as described below.

In some demonstrative embodiments, as shown in FIG. 2, the k-th symbol of data block 208 may be mapped to a k-th subcarrier of spatial stream 214, and the (k+1)-th symbol of data block 208 may be mapped to a P(k)-th subcarrier of spatial stream 244.

In some demonstrative embodiments, as shown in FIG. 2, the k-th symbol of data block 238 may be mapped to a k-th subcarrier of spatial stream 244, and the (k+1)-th symbol of data block 238 may be mapped to a P(k)-th subcarrier of spatial stream 214.

In some demonstrative embodiments, the permutation P(K) may include an STP permutation, a DTP permutation, or any other permutation, e.g., as described above.

In some demonstrative embodiments, as shown in FIG. 2, the space-frequency diversity mapping scheme 200 may map a repeated symbol, of a symbol in a first spatial stream, e.g., the sub-band 216 of the spatial stream 214, to a second sub-band of a second, different, spatial stream, e.g., the sub-band 248 of the spatial stream 244. This type of mapping may be in contrast to a mapping of a repeated symbol to the same stream, e.g., as may be implemented with respect to a SISO scheme.

In some demonstrative embodiments, the space-frequency diversity mapping scheme 200 may allow providing spatial diversity, for example, in addition to exploiting channel frequency diversity, and/or avoiding data loss due to deep notches in the frequency domain.

In some demonstrative embodiments, the space-frequency diversity mapping scheme 200 may allow operation, for example, even when one of the spatial streams 214 and 244 is attenuated, e.g., due to blockage or any other reason, while another spatial stream of streams 214 and 244 survives and has enough quality.

In some demonstrative embodiments, the spatial diversity achieved by the space-frequency diversity mapping scheme 200 may allow, for example, robust transmission, for example, even without re-beamforming of the communication link, for example, in case when a blockage event is temporary, e.g., due to movement in the area of communication.

Referring back to FIG. 1, in some demonstrative embodiments, controller 154 may be configured to cause, trigger, and/or control a wireless station implemented by device 140 to process a MIMO transmission received from another station, for example, the station implemented by device 102, e.g., as described below.

In some demonstrative embodiments, the received MIMO transmission may include a plurality of spatial streams representing a plurality of data bit sequences, e.g., as described above.

In some demonstrative embodiments, controller 154 may be configured to cause, trigger, and/or control the wireless station implemented by device 140 to process the received MIMO transmission, for example, in accordance with the space-frequency diversity mapping scheme 200 (FIG. 2), e.g., as described below.

In some demonstrative embodiments, controller 154 may include, operate as, and/or perform the functionality of a demapper 157, which may be configured to process the plurality of spatial streams to determine a plurality of data blocks, e.g., as described below.

In some demonstrative embodiments, demapper 157 may be configured to determine a pair of first and second consecutive symbols in a data block of the plurality of data blocks, for example, based on a first data subcarrier and a second data subcarrier. For example, the first data subcarrier may be in a first sub-band of a signal band in a first spatial stream of the plurality of spatial streams, and the second data subcarrier may be in a second sub-band of the signal band in a second spatial stream of the plurality of spatial streams.

In some demonstrative embodiments, demapper 157 may be configured to determine first and second data blocks of the plurality of data blocks based on the first and second spatial streams by determining first and second symbols of the first data block based the first and second subcarriers, and determining first and second symbols of the second data block based on a third data subcarrier and a fourth data subcarrier. For example, the third data subcarrier may be the second sub-band in the first spatial stream, and the fourth data subcarrier may be in the first sub-band in the second spatial stream.

In one example, demapper 157 may determine the pair of consecutive symbols 210 and 212 (FIG. 2) in the data block 208 (FIG. 2), for example, based on the data subcarrier 220 (FIG. 2) in the first sub-band 216 (FIG. 2) of the signal band in the first spatial stream 214 (FIG. 2), and the data subcarrier 252 (FIG. 2) in the second sub-band 248 (FIG. 2) of the signal band in the second spatial stream 244 (FIG. 2).

In one example, demapper 157 may determine the pair of consecutive symbols 240 and 242 (FIG. 2) in the data block 238 (FIG. 2), for example, based on the data subcarrier 250 (FIG. 2) in the first sub-band 246 (FIG. 2) of the signal band in the second spatial stream 244 (FIG. 2), and the data subcarrier 222 (FIG. 2) in the second sub-band 214 (FIG. 2) of the signal band in the first spatial stream 214 (FIG. 2).

In some demonstrative embodiments, controller 154 may include, operate as, and/or perform the functionality of a DCM module 159, which may be configured to determine the plurality of data bit sequences based on the plurality of data blocks, for example, by determining a data bit sequence of the plurality of data bit sequences based on the first and second symbols.

In some demonstrative embodiments, DCM module 159 may be configured to determine the plurality of data bit sequences according to an SQPSK DCM scheme, e.g., as described above.

In some demonstrative embodiments, DCM module 159 may be configured to determine the plurality of data bit sequences according to an QPSK DCM scheme, e.g., as described above.

In some demonstrative embodiments, DCM module 159 may be configured to determine the plurality of data bit sequences according to any other dual-carrier or multi-carrier modulation scheme, e.g., as described above.

Figure 3:
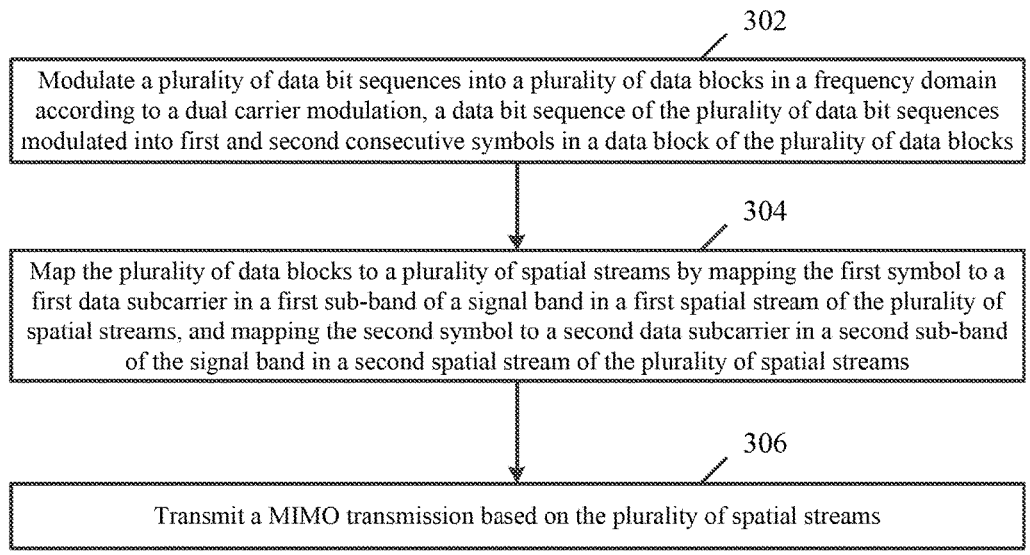
FIG. 3 is a schematic flow-chart illustration of a method of transmitting a transmission according to a transmit space-frequency diversity scheme, in accordance with some demonstrative embodiments.

Reference is made to FIG. 3, which schematically illustrates a method of transmitting a transmission according to a transmit space-frequency diversity scheme, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 302, the method may include modulating a plurality of data bit sequences into a plurality of data blocks in a frequency domain according to a dual carrier modulation. For example, a data bit sequence of the plurality of data bit sequences may be modulated into first and second consecutive symbols in a data block of the plurality of data blocks. For example, controller 124 (FIG. 1) may be configured to cause, trigger, and/or control the wireless station implemented by device 102 (FIG. 1) to modulate the plurality of data bit sequences corresponding to data to be transmitted into a plurality of data blocks in the frequency domain, e.g., as described above.

As indicated at block 304, the method may include mapping the plurality of data blocks to a plurality of spatial streams by mapping the first symbol to a first data subcarrier in a first sub-band of a signal band in a first spatial stream of the plurality of spatial streams, and mapping the second symbol to a second data subcarrier in a second sub-band of the signal band in a second spatial stream of the plurality of spatial streams. For example, controller 124 (FIG. 1) may be configured to cause, trigger, and/or control the wireless station implemented by device 102 (FIG. 1) to map the plurality of data blocks to a plurality of spatial streams, for example, according to the space-frequency diversity mapping scheme 200 (FIG. 2), e.g., as described above.

As indicated at block 306, the method may include transmitting a MIMO transmission based on the plurality of spatial streams. For example, controller 124 (FIG. 1) may be configured to cause, trigger, and/or control the wireless station implemented by device 102 (FIG. 1) to transmit the MIMO transmission based on the plurality of spatial streams, e.g., as described above.

Figure 4:
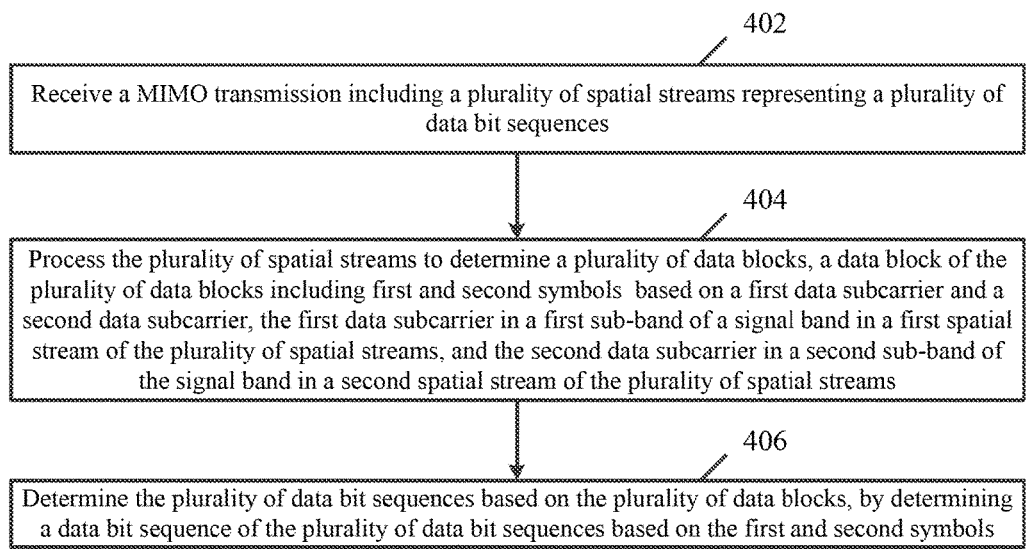
FIG. 4 is a schematic flow-chart illustration of a method of processing a received transmission according to a transmit space-frequency diversity scheme, in accordance with some demonstrative embodiments.

Reference is made to FIG. 4, which schematically illustrates a method of processing a received transmission according to a transmit space-frequency diversity scheme, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include receiving a MIMO transmission including a plurality of spatial streams representing a plurality of data bit sequences. For example, controller 154 (FIG. 1) may be configured to cause, trigger, and/or control the wireless station implemented by device 140 (FIG. 1) to receive from device 102 (FIG. 1) the MIMO transmission including the plurality of spatial streams, e.g., as described above.

As indicated at block 404, the method may include processing the plurality of spatial streams to determine a plurality of data blocks. For example, a data block of the plurality of data blocks may include first and second symbols, which may be based on a first data subcarrier and a second data subcarrier. For example, the first data subcarrier may be in a first sub-band of a signal band in a first spatial stream of the plurality of spatial streams, and the second data subcarrier may be in a second sub-band of the signal band in a second spatial stream of the plurality of spatial streams. For example, controller 154 (FIG. 1) may be configured to cause, trigger, and/or control the wireless station implemented by device 140 (FIG. 1) to determine the first and second symbols, based on the first and second data subcarriers, for example, in accordance with the space-frequency diversity mapping scheme 200 (FIG. 2), e.g., as described above.

As indicated at block 406, the method may include determining the plurality of data bit sequences based on the plurality of data blocks, for example, by determining a data bit sequence of the plurality of data bit sequences based on the first and second symbols. For example, controller 154 (FIG. 1) may be configured to cause, trigger, and/or control the wireless station implemented by device 140 (FIG. 1) to determine the plurality of data bit sequences based on the plurality of data blocks, for example, by determining a data bit sequence of the plurality of data bit sequences based on the first and second symbols, e.g., as described above.

Figure 5:
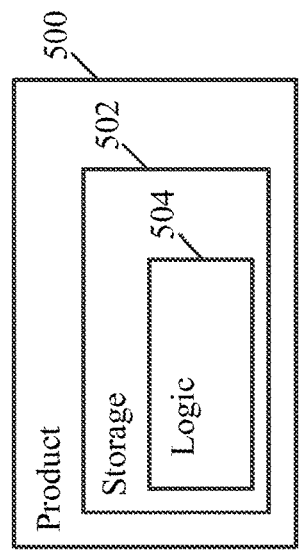
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform, trigger and/or implement one or more operations and/or functionalities, for example, one or more operations and/or functionalities described above with reference to FIGS. 1, 2, 3 and/or 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to modulate a plurality of data bit sequences into a plurality of data blocks in a frequency domain according to a dual carrier modulation, a data bit sequence of the plurality of data bit sequences to be modulated into first and second consecutive symbols in a data block of the plurality of data blocks; map the plurality of data blocks to a plurality of spatial streams by mapping the first symbol to a first data subcarrier in a first sub-band of a signal band in a first spatial stream of the plurality of spatial streams, and mapping the second symbol to a second data subcarrier in a second sub-band of the signal band in a second spatial stream of the plurality of spatial streams; and transmit a Multi-In-Multi-Out (MIMO) transmission based on the plurality of spatial streams.

Example 2 includes the subject matter of Example 1, and optionally, configured to cause the wireless station to map first and second data blocks of the plurality of data blocks to the first and second spatial streams by mapping first and second symbols of the first data block to the first and second subcarriers, and mapping first and second symbols of the second data block to a third data subcarrier and a fourth data subcarrier, the third data subcarrier in the second sub-band in the first spatial stream, and the fourth data subcarrier in the first sub-band in the second spatial stream.

Example 3 includes the subject matter of Example 1 or 2, and optionally, wherein the dual carrier modulation comprises a Staggered Quadrature Phase-Shift Keying (SQPSK) Dual Carrier Modulation (DCM).

Example 4 includes the subject matter of Example 3, and optionally, wherein the data bit sequence comprises two data bits.

Example 5 includes the subject matter of Example 3 or 4, and optionally, wherein the first and second symbols comprise first and second Quadrature Phase-Shift Keying (QPSK) constellation points.

Example 6 includes the subject matter of Example 5, and optionally, wherein the second constellation point comprises a complex conjugate of the first constellation point.

Example 7 includes the subject matter of Example 1 or 2, and optionally, wherein the dual carrier modulation comprises a Quadrature Phase-Shift Keying (QPSK) Dual Carrier Modulation (DCM).

Example 8 includes the subject matter of Example 7, and optionally, wherein the data bit sequence comprises four data bits.

Example 9 includes the subject matter of Example 8, and optionally, configured to cause the wireless station to map first and second data bits of the four data bits to a first QPSK constellation point, to map third and fourth data bits of the four data bits to a second QPSK constellation point, and to map the first and second QPSK constellation points to first and second 16 Quadrature Amplitude Modulation (16QAM) constellation points, the first symbol comprising the first 16QAM constellation point, and the second symbol comprising the second 16QAM constellation point.

Example 10 includes the subject matter of any one of Examples 1-9, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 11 includes the subject matter of Example 10, and optionally, wherein P(k) comprises a Static Tone Pairing (STP) permutation.

Example 12 includes the subject matter of Example 10, and optionally, wherein P(k) comprises a Dynamic Tone Pairing (DTP) permutation.

Example 13 includes the subject matter of any one of Examples 1-12, and optionally, wherein the first sub-band comprises a first half of the signal band, and the second sub-band comprises a second half of the signal band.

Example 14 includes the subject matter of any one of Examples 1-13, and optionally, wherein the MIMO transmission comprises a 2×2 MIMO transmission.

Example 15 includes the subject matter of any one of Examples 1-14, and optionally, wherein the MIMO transmission comprises an Orthogonal Frequency Modulation (OFDM) MIMO transmission comprising a plurality of OFDM symbols based on the plurality of spatial streams.

Example 16 includes the subject matter of any one of Examples 1-15, and optionally, configured to cause the wireless station to transmit the MIMO transmission over a Directional Multi-Gigabit (DMG) band.

Example 17 includes the subject matter of any one of Examples 1-16, and optionally, wherein the wireless station is a Directional Multi-Gigabit (DMG) Station (STA).

Example 18 includes the subject matter of any one of Examples 1-17, and optionally, comprising a plurality of directional antennas to transmit the plurality of spatial streams.

Example 19 includes the subject matter of any one of Examples 1-18, and optionally, comprising a radio, a memory, and a processor.

Example 20 includes a system of wireless communication comprising a wireless station, the wireless station comprising a plurality of directional antennas; a memory; a processor; a radio; and a controller configured to cause the wireless station to modulate a plurality of data bit sequences into a plurality of data blocks in a frequency domain according to a dual carrier modulation, a data bit sequence of the plurality of data bit sequences to be modulated into first and second consecutive symbols in a data block of the plurality of data blocks; map the plurality of data blocks to a plurality of spatial streams by mapping the first symbol to a first data subcarrier in a first sub-band of a signal band in a first spatial stream of the plurality of spatial streams, and mapping the second symbol to a second data subcarrier in a second sub-band of the signal band in a second spatial stream of the plurality of spatial streams; and transmit a Multi-In-Multi-Out (MIMO) transmission based on the plurality of spatial streams.

Example 21 includes the subject matter of Example 20, and optionally, wherein the wireless station is to map first and second data blocks of the plurality of data blocks to the first and second spatial streams by mapping first and second symbols of the first data block to the first and second subcarriers, and mapping first and second symbols of the second data block to a third data subcarrier and a fourth data subcarrier, the third data subcarrier in the second sub-band in the first spatial stream, and the fourth data subcarrier in the first sub-band in the second spatial stream.

Example 22 includes the subject matter of Example 20 or 21, and optionally, wherein the dual carrier modulation comprises a Staggered Quadrature Phase-Shift Keying (SQPSK) Dual Carrier Modulation (DCM).

Example 23 includes the subject matter of Example 22, and optionally, wherein the data bit sequence comprises two data bits.

Example 24 includes the subject matter of Example 22 or 23, and optionally, wherein the first and second symbols comprise first and second Quadrature Phase-Shift Keying (QPSK) constellation points.

Example 25 includes the subject matter of Example 24, and optionally, wherein the second constellation point comprises a complex conjugate of the first constellation point.

Example 26 includes the subject matter of Example 20 or 21, and optionally, wherein the dual carrier modulation comprises a Quadrature Phase-Shift Keying (QPSK) Dual Carrier Modulation (DCM).

Example 27 includes the subject matter of Example 26, and optionally, wherein the data bit sequence comprises four data bits.

Example 28 includes the subject matter of Example 27, and optionally, wherein the wireless station is to map first and second data bits of the four data bits to a first QPSK constellation point, to map third and fourth data bits of the four data bits to a second QPSK constellation point, and to map the first and second QPSK constellation points to first and second 16 Quadrature Amplitude Modulation (16QAM) constellation points, the first symbol comprising the first 16QAM constellation point, and the second symbol comprising the second 16QAM constellation point.

Example 29 includes the subject matter of any one of Examples 20-28, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 30 includes the subject matter of Example 29, and optionally, wherein P(k) comprises a Static Tone Pairing (STP) permutation.

Example 31 includes the subject matter of Example 29, and optionally, wherein P(k) comprises a Dynamic Tone Pairing (DTP) permutation.

Example 32 includes the subject matter of any one of Examples 20-31, and optionally, wherein the first sub-band comprises a first half of the signal band, and the second sub-band comprises a second half of the signal band.

Example 33 includes the subject matter of any one of Examples 20-32, and optionally, wherein the MIMO transmission comprises a 2×2 MIMO transmission.

Example 34 includes the subject matter of any one of Examples 20-33, and optionally, wherein the MIMO transmission comprises an Orthogonal Frequency Modulation (OFDM) MIMO transmission comprising a plurality of OFDM symbols based on the plurality of spatial streams.

Example 35 includes the subject matter of any one of Examples 20-34, and optionally, wherein the wireless station is to transmit the MIMO transmission over a Directional Multi-Gigabit (DMG) band.

Example 36 includes the subject matter of any one of Examples 20-35, and optionally, wherein the wireless station is a Directional Multi-Gigabit (DMG) Station (STA).

Example 37 includes a method to be performed at a wireless station, the method comprising modulating a plurality of data bit sequences into a plurality of data blocks in a frequency domain according to a dual carrier modulation, a data bit sequence of the plurality of data bit sequences to be modulated into first and second consecutive symbols in a data block of the plurality of data blocks; mapping the plurality of data blocks to a plurality of spatial streams by mapping the first symbol to a first data subcarrier in a first sub-band of a signal band in a first spatial stream of the plurality of spatial streams, and mapping the second symbol to a second data subcarrier in a second sub-band of the signal band in a second spatial stream of the plurality of spatial streams; and transmitting a Multi-In-Multi-Out (MIMO) transmission based on the plurality of spatial streams.

Example 38 includes the subject matter of Example 37, and optionally, comprising mapping first and second data blocks of the plurality of data blocks to the first and second spatial streams by mapping first and second symbols of the first data block to the first and second subcarriers, and mapping first and second symbols of the second data block to a third data subcarrier and a fourth data subcarrier, the third data subcarrier in the second sub-band in the first spatial stream, and the fourth data subcarrier in the first sub-band in the second spatial stream.

Example 39 includes the subject matter of Example 37 or 38, and optionally, wherein the dual carrier modulation comprises a Staggered Quadrature Phase-Shift Keying (SQPSK) Dual Carrier Modulation (DCM).

Example 40 includes the subject matter of Example 39, and optionally, wherein the data bit sequence comprises two data bits.

Example 41 includes the subject matter of Example 39 or 40, and optionally, wherein the first and second symbols comprise first and second Quadrature Phase-Shift Keying (QPSK) constellation points.

Example 42 includes the subject matter of Example 41, and optionally, wherein the second constellation point comprises a complex conjugate of the first constellation point.

Example 43 includes the subject matter of Example 37 or 38, and optionally, wherein the dual carrier modulation comprises a Quadrature Phase-Shift Keying (QPSK) Dual Carrier Modulation (DCM).

Example 44 includes the subject matter of Example 43, and optionally, wherein the data bit sequence comprises four data bits.

Example 45 includes the subject matter of Example 44, and optionally, comprising mapping first and second data bits of the four data bits to a first QPSK constellation point, mapping third and fourth data bits of the four data bits to a second QPSK constellation point, and mapping the first and second QPSK constellation points to first and second 16 Quadrature Amplitude Modulation (16QAM) constellation points, the first symbol comprising the first 16QAM constellation point, and the second symbol comprising the second 16QAM constellation point.

Example 46 includes the subject matter of any one of Examples 37-45, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 47 includes the subject matter of Example 46, and optionally, wherein P(k) comprises a Static Tone Pairing (STP) permutation.

Example 48 includes the subject matter of Example 46, and optionally, wherein P(k) comprises a Dynamic Tone Pairing (DTP) permutation.

Example 49 includes the subject matter of any one of Examples 37-48, and optionally, wherein the first sub-band comprises a first half of the signal band, and the second sub-band comprises a second half of the signal band.

Example 50 includes the subject matter of any one of Examples 37-49, and optionally, wherein the MIMO transmission comprises a 2×2 MIMO transmission.

Example 51 includes the subject matter of any one of Examples 37-50, and optionally, wherein the MIMO transmission comprises an Orthogonal Frequency Modulation (OFDM) MIMO transmission comprising a plurality of OFDM symbols based on the plurality of spatial streams.

Example 52 includes the subject matter of any one of Examples 37-51, and optionally, comprising transmitting the MIMO transmission over a Directional Multi-Gigabit (DMG) band.

Example 53 includes the subject matter of any one of Examples 37-52, and optionally, wherein the wireless station is a Directional Multi-Gigabit (DMG) Station (STA).

Example 54 includes a product comprising one or more tangible computer-readable non-transitory storage media comprising computer-executable instructions operable to, when executed by at least one computer processor, enable the at least one computer processor to implement operations at a wireless station, the operations comprising modulating a plurality of data bit sequences into a plurality of data blocks in a frequency domain according to a dual carrier modulation, a data bit sequence of the plurality of data bit sequences to be modulated into first and second consecutive symbols in a data block of the plurality of data blocks; mapping the plurality of data blocks to a plurality of spatial streams by mapping the first symbol to a first data subcarrier in a first sub-band of a signal band in a first spatial stream of the plurality of spatial streams, and mapping the second symbol to a second data subcarrier in a second sub-band of the signal band in a second spatial stream of the plurality of spatial streams; and transmitting a Multi-In-Multi-Out (MIMO) transmission based on the plurality of spatial streams.

Example 55 includes the subject matter of Example 54, and optionally, wherein the operations comprise mapping first and second data blocks of the plurality of data blocks to the first and second spatial streams by mapping first and second symbols of the first data block to the first and second subcarriers, and mapping first and second symbols of the second data block to a third data subcarrier and a fourth data subcarrier, the third data subcarrier in the second sub-band in the first spatial stream, and the fourth data subcarrier in the first sub-band in the second spatial stream.

Example 56 includes the subject matter of Example 54 or 55, and optionally, wherein the dual carrier modulation comprises a Staggered Quadrature Phase-Shift Keying (SQPSK) Dual Carrier Modulation (DCM).

Example 57 includes the subject matter of Example 56, and optionally, wherein the data bit sequence comprises two data bits.

Example 58 includes the subject matter of Example 56 or 57, and optionally, wherein the first and second symbols comprise first and second Quadrature Phase-Shift Keying (QPSK) constellation points.

Example 59 includes the subject matter of Example 58, and optionally, wherein the second constellation point comprises a complex conjugate of the first constellation point.

Example 60 includes the subject matter of Example 54 or 55, and optionally, wherein the dual carrier modulation comprises a Quadrature Phase-Shift Keying (QPSK) Dual Carrier Modulation (DCM).

Example 61 includes the subject matter of Example 60, and optionally, wherein the data bit sequence comprises four data bits.

Example 62 includes the subject matter of Example 61, and optionally, wherein the operations comprise mapping first and second data bits of the four data bits to a first QPSK constellation point, mapping third and fourth data bits of the four data bits to a second QPSK constellation point, and mapping the first and second QPSK constellation points to first and second 16 Quadrature Amplitude Modulation (16QAM) constellation points, the first symbol comprising the first 16QAM constellation point, and the second symbol comprising the second 16QAM constellation point.

Example 63 includes the subject matter of any one of Examples 54-62, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 64 includes the subject matter of Example 63, and optionally, wherein P(k) comprises a Static Tone Pairing (STP) permutation.

Example 65 includes the subject matter of Example 63, and optionally, wherein P(k) comprises a Dynamic Tone Pairing (DTP) permutation.

Example 66 includes the subject matter of any one of Examples 54-65, and optionally, wherein the first sub-band comprises a first half of the signal band, and the second sub-band comprises a second half of the signal band.

Example 67 includes the subject matter of any one of Examples 54-66, and optionally, wherein the MIMO transmission comprises a 2×2 MIMO transmission.

Example 68 includes the subject matter of any one of Examples 54-67, and optionally, wherein the MIMO transmission comprises an Orthogonal Frequency Modulation (OFDM) MIMO transmission comprising a plurality of OFDM symbols based on the plurality of spatial streams.

Example 69 includes the subject matter of any one of Examples 54-68, and optionally, wherein the operations comprise transmitting the MIMO transmission over a Directional Multi-Gigabit (DMG) band.

Example 70 includes the subject matter of any one of Examples 54-69, and optionally, wherein the wireless station is a Directional Multi-Gigabit (DMG) Station (STA).

Example 71 includes an apparatus of wireless communication by a wireless station, the apparatus comprising means for modulating a plurality of data bit sequences into a plurality of data blocks in a frequency domain according to a dual carrier modulation, a data bit sequence of the plurality of data bit sequences to be modulated into first and second consecutive symbols in a data block of the plurality of data blocks; means for mapping the plurality of data blocks to a plurality of spatial streams by mapping the first symbol to a first data subcarrier in a first sub-band of a signal band in a first spatial stream of the plurality of spatial streams, and mapping the second symbol to a second data subcarrier in a second sub-band of the signal band in a second spatial stream of the plurality of spatial streams; and means for transmitting a Multi-In-Multi-Out (MIMO) transmission based on the plurality of spatial streams.

Example 72 includes the subject matter of Example 71, and optionally, comprising means for mapping first and second data blocks of the plurality of data blocks to the first and second spatial streams by mapping first and second symbols of the first data block to the first and second subcarriers, and mapping first and second symbols of the second data block to a third data subcarrier and a fourth data subcarrier, the third data subcarrier in the second sub-band in the first spatial stream, and the fourth data subcarrier in the first sub-band in the second spatial stream.

Example 73 includes the subject matter of Example 71 or 72, and optionally, wherein the dual carrier modulation comprises a Staggered Quadrature Phase-Shift Keying (SQPSK) Dual Carrier Modulation (DCM).

Example 74 includes the subject matter of Example 73, and optionally, wherein the data bit sequence comprises two data bits.

Example 75 includes the subject matter of Example 73 or 74, and optionally, wherein the first and second symbols comprise first and second Quadrature Phase-Shift Keying (QPSK) constellation points.

Example 76 includes the subject matter of Example 75, and optionally, wherein the second constellation point comprises a complex conjugate of the first constellation point.

Example 77 includes the subject matter of Example 71 or 72, and optionally, wherein the dual carrier modulation comprises a Quadrature Phase-Shift Keying (QPSK) Dual Carrier Modulation (DCM).

Example 78 includes the subject matter of Example 77, and optionally, wherein the data bit sequence comprises four data bits.

Example 79 includes the subject matter of Example 78, and optionally, comprising means for mapping first and second data bits of the four data bits to a first QPSK constellation point, mapping third and fourth data bits of the four data bits to a second QPSK constellation point, and mapping the first and second QPSK constellation points to first and second 16 Quadrature Amplitude Modulation (16QAM) constellation points, the first symbol comprising the first 16QAM constellation point, and the second symbol comprising the second 16QAM constellation point.

Example 80 includes the subject matter of any one of Examples 71-79, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 81 includes the subject matter of Example 80, and optionally, wherein P(k) comprises a Static Tone Pairing (STP) permutation.

Example 82 includes the subject matter of Example 80, and optionally, wherein P(k) comprises a Dynamic Tone Pairing (DTP) permutation.

Example 83 includes the subject matter of any one of Examples 71-82, and optionally, wherein the first sub-band comprises a first half of the signal band, and the second sub-band comprises a second half of the signal band.

Example 84 includes the subject matter of any one of Examples 71-83, and optionally, wherein the MIMO transmission comprises a 2×2 MIMO transmission.

Example 85 includes the subject matter of any one of Examples 71-84, and optionally, wherein the MIMO transmission comprises an Orthogonal Frequency Modulation (OFDM) MIMO transmission comprising a plurality of OFDM symbols based on the plurality of spatial streams.

Example 86 includes the subject matter of any one of Examples 71-85, and optionally, comprising means for transmitting the MIMO transmission over a Directional Multi-Gigabit (DMG) band.

Example 87 includes the subject matter of any one of Examples 71-86, and optionally, wherein the wireless station is a Directional Multi-Gigabit (DMG) Station (STA).

Example 88 includes an apparatus comprising logic and circuitry configured to cause a wireless station to receive a Multi-In-Multi-Out (MIMO) transmission comprising a plurality of spatial streams representing a plurality of data bit sequences; process the plurality of spatial streams to determine a plurality of data blocks, a data block of the plurality of data blocks comprising first and second consecutive symbols, the first and second symbols are based on a first data subcarrier and a second data subcarrier, the first data subcarrier in a first sub-band of a signal band in a first spatial stream of the plurality of spatial streams, and the second data subcarrier in a second sub-band of the signal band in a second spatial stream of the plurality of spatial streams; and determine the plurality of data bit sequences based on the plurality of data blocks by determining a data bit sequence of the plurality of data bit sequences based on the first and second symbols.

Example 89 includes the subject matter of Example 88, and optionally, configured to cause the wireless station to determine first and second data blocks of the plurality of data blocks based on the first and second spatial streams, by determining first and second symbols of the first data block based on the first and second subcarriers, and determining first and second symbols of the second data block based on a third data subcarrier and a fourth data subcarrier, the third data subcarrier in the second sub-band in the first spatial stream, and the fourth data subcarrier in the first sub-band in the second spatial stream.

Example 90 includes the subject matter of Example 88 or 89, and optionally, configured to cause the wireless station to determine the plurality of data bit sequences according to a Staggered Quadrature Phase-Shift Keying (SQPSK) Dual Carrier Modulation (DCM) scheme.

Example 91 includes the subject matter of Example 90, and optionally, wherein the data bit sequence comprises two data bits.

Example 92 includes the subject matter of Example 90 or 91, and optionally, wherein the first and second symbols comprise first and second Quadrature Phase-Shift Keying (QPSK) constellation points.

Example 93 includes the subject matter of Example 92, and optionally, wherein the second constellation point comprises a complex conjugate of the first constellation point.

Example 94 includes the subject matter of Example 88 or 89, and optionally, configured to cause the wireless station to determine the plurality of data bit sequences according to a Quadrature Phase-Shift Keying (QPSK) Dual Carrier Modulation (DCM) scheme.

Example 95 includes the subject matter of Example 94, and optionally, wherein the data bit sequence comprises four data bits.

Example 96 includes the subject matter of any one of Examples 88-95, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 97 includes the subject matter of Example 96, and optionally, wherein P(k) comprises a Static Tone Pairing (STP) permutation.

Example 98 includes the subject matter of Example 96, and optionally, wherein P(k) comprises a Dynamic Tone Pairing (DTP) permutation.

Example 99 includes the subject matter of any one of Examples 88-98, and optionally, wherein the first sub-band comprises a first half of the signal band, and the second sub-band comprises a second half of the signal band.

Example 100 includes the subject matter of any one of Examples 88-99, and optionally, wherein the MIMO transmission comprises a 2×2 MIMO transmission.

Example 101 includes the subject matter of any one of Examples 88-100, and optionally, wherein the MIMO transmission comprises an Orthogonal Frequency Modulation (OFDM) MIMO transmission comprising a plurality of OFDM symbols based on the plurality of spatial streams.

Example 102 includes the subject matter of any one of Examples 88-101, and optionally, configured to cause the wireless station to receive the MIMO transmission over a Directional Multi-Gigabit (DMG) band.

Example 103 includes the subject matter of any one of Examples 88-102, and optionally, wherein the wireless station is a Directional Multi-Gigabit (DMG) Station (STA).

Example 104 includes the subject matter of any one of Examples 88-103, and optionally, comprising a plurality of directional antennas to receive the plurality of spatial streams.

Example 105 includes the subject matter of any one of Examples 88-104, and optionally, comprising a radio, a memory, and a processor.

Example 106 includes a system of wireless communication comprising a wireless station, the wireless station comprising a plurality of directional antennas; a radio; a memory; a processor; and a controller configured to cause the wireless station to receive a Multi-In-Multi-Out (MIMO) transmission comprising a plurality of spatial streams representing a plurality of data bit sequences; process the plurality of spatial streams to determine a plurality of data blocks, a data block of the plurality of data blocks comprising first and second consecutive symbols, the first and second symbols are based on a first data subcarrier and a second data subcarrier, the first data subcarrier in a first sub-band of a signal band in a first spatial stream of the plurality of spatial streams, and the second data subcarrier in a second sub-band of the signal band in a second spatial stream of the plurality of spatial streams; and determine the plurality of data bit sequences based on the plurality of data blocks by determining a data bit sequence of the plurality of data bit sequences based on the first and second symbols.

Example 107 includes the subject matter of Example 106, and optionally, wherein the wireless station is to determine first and second data blocks of the plurality of data blocks based on the first and second spatial streams, by determining first and second symbols of the first data block based on the first and second subcarriers, and determining first and second symbols of the second data block based on a third data subcarrier and a fourth data subcarrier, the third data subcarrier in the second sub-band in the first spatial stream, and the fourth data subcarrier in the first sub-band in the second spatial stream.

Example 108 includes the subject matter of Example 106 or 107, and optionally, wherein the wireless station is to determine the plurality of data bit sequences according to a Staggered Quadrature Phase-Shift Keying (SQPSK) Dual Carrier Modulation (DCM) scheme.

Example 109 includes the subject matter of Example 108, and optionally, wherein the data bit sequence comprises two data bits.

Example 110 includes the subject matter of Example 108 or 109, and optionally, wherein the first and second symbols comprise first and second Quadrature Phase-Shift Keying (QPSK) constellation points.

Example 111 includes the subject matter of Example 110, and optionally, wherein the second constellation point comprises a complex conjugate of the first constellation point.

Example 112 includes the subject matter of Example 106 or 107, and optionally, wherein the wireless station is to determine the plurality of data bit sequences according to a Quadrature Phase-Shift Keying (QPSK) Dual Carrier Modulation (DCM) scheme.

Example 113 includes the subject matter of Example 112, and optionally, wherein the data bit sequence comprises four data bits.

Example 114 includes the subject matter of any one of Examples 106-113, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 115 includes the subject matter of Example 114, and optionally, wherein P(k) comprises a Static Tone Pairing (STP) permutation.

Example 116 includes the subject matter of Example 114, and optionally, wherein P(k) comprises a Dynamic Tone Pairing (DTP) permutation.

Example 117 includes the subject matter of any one of Examples 106-116, and optionally, wherein the first sub-band comprises a first half of the signal band, and the second sub-band comprises a second half of the signal band.

Example 118 includes the subject matter of any one of Examples 106-117, and optionally, wherein the MIMO transmission comprises a 2×2 MIMO transmission.

Example 119 includes the subject matter of any one of Examples 106-118, and optionally, wherein the MIMO transmission comprises an Orthogonal Frequency Modulation (OFDM) MIMO transmission comprising a plurality of OFDM symbols based on the plurality of spatial streams.

Example 120 includes the subject matter of any one of Examples 106-119, and optionally, wherein the wireless station is to receive the MIMO transmission over a Directional Multi-Gigabit (DMG) band.

Example 121 includes the subject matter of any one of Examples 106-120, and optionally, wherein the wireless station is a Directional Multi-Gigabit (DMG) Station (STA).

Example 122 includes a method to be performed at a wireless station, the method comprising receiving a Multi-In-Multi-Out (MIMO) transmission comprising a plurality of spatial streams representing a plurality of data bit sequences; processing the plurality of spatial streams to determine a plurality of data blocks, a data block of the plurality of data blocks comprising first and second consecutive symbols, the first and second symbols are based on a first data subcarrier an a second data subcarrier, the first data subcarrier in a first sub-band of a signal band in a first spatial stream of the plurality of spatial streams, and the second data subcarrier in a second sub-band of the signal band in a second spatial stream of the plurality of spatial streams; and determining the plurality of data bit sequences based on the plurality of data blocks by determining a data bit sequence of the plurality of data bit sequences based on the first and second symbols.

Example 123 includes the subject matter of Example 122, and optionally, comprising determining first and second data blocks of the plurality of data blocks based on the first and second spatial streams, by determining first and second symbols of the first data block based on the first and second subcarriers, and determining first and second symbols of the second data block based on a third data subcarrier and a fourth data subcarrier, the third data subcarrier in the second sub-band in the first spatial stream, and the fourth data subcarrier in the first sub-band in the second spatial stream.

Example 124 includes the subject matter of Example 122 or 123, and optionally, comprising determining the plurality of data bit sequences according to a Staggered Quadrature Phase-Shift Keying (SQPSK) Dual Carrier Modulation (DCM) scheme.

Example 125 includes the subject matter of Example 124, and optionally, wherein the data bit sequence comprises two data bits.

Example 126 includes the subject matter of Example 124 or 125, and optionally, wherein the first and second symbols comprise first and second Quadrature Phase-Shift Keying (QPSK) constellation points.

Example 127 includes the subject matter of Example 126, and optionally, wherein the second constellation point comprises a complex conjugate of the first constellation point.

Example 128 includes the subject matter of Example 122 or 123, and optionally, comprising determining the plurality of data bit sequences according to a Quadrature Phase-Shift Keying (QPSK) Dual Carrier Modulation (DCM) scheme.

Example 129 includes the subject matter of Example 128, and optionally, wherein the data bit sequence comprises four data bits.

Example 130 includes the subject matter of any one of Examples 122-129, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 131 includes the subject matter of Example 130, and optionally, wherein P(k) comprises a Static Tone Pairing (STP) permutation.

Example 132 includes the subject matter of Example 130, and optionally, wherein P(k) comprises a Dynamic Tone Pairing (DTP) permutation.

Example 133 includes the subject matter of any one of Examples 122-132, and optionally, wherein the first sub-band comprises a first half of the signal band, and the second sub-band comprises a second half of the signal band.

Example 134 includes the subject matter of any one of Examples 122-133, and optionally, wherein the MIMO transmission comprises a 2×2 MIMO transmission.

Example 135 includes the subject matter of any one of Examples 122-134, and optionally, wherein the MIMO transmission comprises an Orthogonal Frequency Modulation (OFDM) MIMO transmission comprising a plurality of OFDM symbols based on the plurality of spatial streams.

Example 136 includes the subject matter of any one of Examples 122-135, and optionally, comprising receiving the MIMO transmission over a Directional Multi-Gigabit (DMG) band.

Example 137 includes the subject matter of any one of Examples 122-136, and optionally, wherein the wireless station is a Directional Multi-Gigabit (DMG) Station (STA).

Example 138 includes a product comprising one or more tangible computer-readable non-transitory storage media comprising computer-executable instructions operable to, when executed by at least one computer processor, enable the at least one computer processor to implement operations at a wireless station, the operations comprising receiving a Multi-In-Multi-Out (MIMO) transmission comprising a plurality of spatial streams representing a plurality of data bit sequences; processing the plurality of spatial streams to determine a plurality of data blocks, a data block of the plurality of data blocks comprising first and second consecutive symbols, the first and second symbols are based on a first data subcarrier an a second data subcarrier, the first data subcarrier in a first sub-band of a signal band in a first spatial stream of the plurality of spatial streams, and the second data subcarrier in a second sub-band of the signal band in a second spatial stream of the plurality of spatial streams; and determining the plurality of data bit sequences based on the plurality of data blocks by determining a data bit sequence of the plurality of data bit sequences based on the first and second symbols.

Example 139 includes the subject matter of Example 138, and optionally, wherein the operations comprise determining first and second data blocks of the plurality of data blocks based on the first and second spatial streams, by determining first and second symbols of the first data block based on the first and second subcarriers, and determining first and second symbols of the second data block based on a third data subcarrier and a fourth data subcarrier, the third data subcarrier in the second sub-band in the first spatial stream, and the fourth data subcarrier in the first sub-band in the second spatial stream.

Example 140 includes the subject matter of Example 138 or 139, and optionally, wherein the operations comprise determining the plurality of data bit sequences according to a Staggered Quadrature Phase-Shift Keying (SQPSK) Dual Carrier Modulation (DCM) scheme.

Example 141 includes the subject matter of Example 140, and optionally, wherein the data bit sequence comprises two data bits.

Example 142 includes the subject matter of Example 140 or 141, and optionally, wherein the first and second symbols comprise first and second Quadrature Phase-Shift Keying (QPSK) constellation points.

Example 143 includes the subject matter of Example 142, and optionally, wherein the second constellation point comprises a complex conjugate of the first constellation point.

Example 144 includes the subject matter of Example 138 or 139, and optionally, wherein the operations comprise determining the plurality of data bit sequences according to a Quadrature Phase-Shift Keying (QPSK) Dual Carrier Modulation (DCM) scheme.

Example 145 includes the subject matter of Example 144, and optionally, wherein the data bit sequence comprises four data bits.

Example 146 includes the subject matter of any one of Examples 138-145, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 147 includes the subject matter of Example 146, and optionally, wherein P(k) comprises a Static Tone Pairing (STP) permutation.

Example 148 includes the subject matter of Example 146, and optionally, wherein P(k) comprises a Dynamic Tone Pairing (DTP) permutation.

Example 149 includes the subject matter of any one of Examples 138-148, and optionally, wherein the first sub-band comprises a first half of the signal band, and the second sub-band comprises a second half of the signal band.

Example 150 includes the subject matter of any one of Examples 138-149, and optionally, wherein the MIMO transmission comprises a 2×2 MIMO transmission.

Example 151 includes the subject matter of any one of Examples 138-150, and optionally, wherein the MIMO transmission comprises an Orthogonal Frequency Modulation (OFDM) MIMO transmission comprising a plurality of OFDM symbols based on the plurality of spatial streams.

Example 152 includes the subject matter of any one of Examples 138-151, and optionally, wherein the operations comprise receiving the MIMO transmission over a Directional Multi-Gigabit (DMG) band.

Example 153 includes the subject matter of any one of Examples 138-152, and optionally, wherein the wireless station is a Directional Multi-Gigabit (DMG) Station (STA).

Example 154 includes an apparatus of wireless communication by a wireless station, the apparatus comprising means for receiving a Multi-In-Multi-Out (MIMO) transmission comprising a plurality of spatial streams representing a plurality of data bit sequences; means for processing the plurality of spatial streams to determine a plurality of data blocks, a data block of the plurality of data blocks comprising first and second consecutive symbols, the first and second symbols are based on a first data subcarrier an a second data subcarrier, the first data subcarrier in a first sub-band of a signal band in a first spatial stream of the plurality of spatial streams, and the second data subcarrier in a second sub-band of the signal band in a second spatial stream of the plurality of spatial streams; and means for determining the plurality of data bit sequences based on the plurality of data blocks by determining a data bit sequence of the plurality of data bit sequences based on the first and second symbols.

Example 155 includes the subject matter of Example 154, and optionally, comprising means for determining first and second data blocks of the plurality of data blocks based on the first and second spatial streams, by determining first and second symbols of the first data block based on the first and second subcarriers, and determining first and second symbols of the second data block based on a third data subcarrier and a fourth data subcarrier, the third data subcarrier in the second sub-band in the first spatial stream, and the fourth data subcarrier in the first sub-band in the second spatial stream.

Example 156 includes the subject matter of Example 154 or 155, and optionally, comprising means for determining the plurality of data bit sequences according to a Staggered Quadrature Phase-Shift Keying (SQPSK) Dual Carrier Modulation (DCM) scheme.

Example 157 includes the subject matter of Example 156, and optionally, wherein the data bit sequence comprises two data bits.

Example 158 includes the subject matter of Example 156 or 157, and optionally, wherein the first and second symbols comprise first and second Quadrature Phase-Shift Keying (QPSK) constellation points.

Example 159 includes the subject matter of Example 158, and optionally, wherein the second constellation point comprises a complex conjugate of the first constellation point.

Example 160 includes the subject matter of Example 154 or 155, and optionally, comprising means for determining the plurality of data bit sequences according to a Quadrature Phase-Shift Keying (QPSK) Dual Carrier Modulation (DCM) scheme.

Example 161 includes the subject matter of Example 160, and optionally, wherein the data bit sequence comprises four data bits.

Example 162 includes the subject matter of any one of Examples 154-161, and optionally, wherein the first symbol comprises a k-th symbol in the data block, the first data subcarrier comprises a k-th data subcarrier in the first sub-band, and the second data subcarrier comprises a P(k)-th data subcarrier in the second sub-band, wherein P(k) is a predefined permutation of k.

Example 163 includes the subject matter of Example 162, and optionally, wherein P(k) comprises a Static Tone Pairing (STP) permutation.

Example 164 includes the subject matter of Example 162, and optionally, wherein P(k) comprises a Dynamic Tone Pairing (DTP) permutation.

Example 165 includes the subject matter of any one of Examples 154-164, and optionally, wherein the first sub-band comprises a first half of the signal band, and the second sub-band comprises a second half of the signal band.

Example 166 includes the subject matter of any one of Examples 154-165, and optionally, wherein the MIMO transmission comprises a 2×2 MIMO transmission.

Example 167 includes the subject matter of any one of Examples 154-166, and optionally, wherein the MIMO transmission comprises an Orthogonal Frequency Modulation (OFDM) MIMO transmission comprising a plurality of OFDM symbols based on the plurality of spatial streams.

Example 168 includes the subject matter of any one of Examples 154-167, and optionally, comprising means for receiving the MIMO transmission over a Directional Multi-Gigabit (DMG) band.

Example 169 includes the subject matter of any one of Examples 154-168, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station (STA) to:
    modulate a plurality of data bit sequences into a plurality of constellation points in first and second spatial streams according to a Dual Carrier Modulation (DCM), a data bit sequence of the plurality of data bit sequences comprises a sequence of a plurality of data bits, modulating the plurality of data bit sequences comprises modulating the sequence of the plurality of data bits into a first constellation point in the first spatial stream and a second constellation point in the second spatial stream, the second constellation point is a complex conjugate of the first constellation point, the first constellation point comprises a k-th constellation point in the first spatial stream, the second constellation point comprises a P(k)-th constellation point in the second spatial stream, wherein P(k) is a predefined function of k; and
    transmit an Orthogonal Frequency Division Multiplexing (OFDM) transmission over a wireless communication channel in a frequency band above 45 Gigahertz (GHz), the OFDM transmission based on the plurality of constellation points in the first and second spatial streams.

2. The apparatus of claim 1, wherein the data bit sequence comprises a pair of consecutive data bits.

3. The apparatus of claim 2, wherein the pair of consecutive data bits comprises a first data bit having an index corresponding to k, and a second data bit immediately successive to the first data bit.

4. The apparatus of claim 2 configured to cause the STA to modulate the pair of consecutive data bits to the k-th constellation point in the first spatial stream as follows:

$$\frac{1}{\sqrt{2}}((2c_0 - 1) + j(2c_1 - 1))$$

and to modulate the pair of consecutive data bits to the P(k)-th constellation point in the second spatial stream as follows:

$$\frac{1}{\sqrt{2}}((2c_0 - 1) - j(2c_1 - 1))$$

wherein $c_0$ denotes a first data bit of the pair of consecutive data bits, and $c_1$ denotes a second data bit of the pair of consecutive data bits.

5. The apparatus of claim 1 configured to cause the STA to modulate another data bit sequence into a third constellation point in the first spatial stream and a fourth constellation point in the second spatial stream, the third constellation point comprises a P(k)-th constellation point in the first spatial stream, the fourth constellation point comprises a k-th constellation point in the second stream.

6. The apparatus of claim 1, wherein P(k) is a sum of k and half of a number of subcarriers.

7. The apparatus of claim 1, wherein P(k) is a mapping of k according to a Static Tone Pairing (STP).

8. The apparatus of claim 1, wherein P(k)=k+168.

9. The apparatus of claim 1 configured to cause the STA to generate the plurality of data bit sequences according to a Phase Shift Keying (PSK) modulation.

10. The apparatus of claim 1 comprising a radio.

11. The apparatus of claim 1 comprising a memory, a processor, and one or more antennas.

12. A product comprising one or more tangible computer-readable non-transitory storage media comprising computer-executable instructions operable to, when executed by at least one processor, enable the at least one processor to cause a wireless communication station (STA) to:

modulate a plurality of data bit sequences into a plurality of constellation points in first and second spatial streams according to a Dual Carrier Modulation (DCM), a data bit sequence of the plurality of data bit sequences comprises a sequence of a plurality of data bits, modulating the plurality of data bit sequences comprises modulating the sequence of the plurality of data bits into a first constellation point in the first spatial stream and a second constellation point in the second spatial stream, the second constellation point is a complex conjugate of the first constellation point, the first constellation point comprises a k-th constellation point in the first spatial stream, the second constellation point comprises a P(k)-th constellation point in the second spatial stream, wherein P(k) is a predefined function of k; and transmit an Orthogonal Frequency Division Multiplexing (OFDM) transmission over a wireless communication channel in a frequency band above 45 Gigahertz (GHz), the OFDM transmission based on the plurality of constellation points in the first and second spatial streams.

13. The product of claim 12, wherein the data bit sequence comprises a pair of consecutive data bits.

14. The product of claim 13, wherein the pair of consecutive data bits comprises a first data bit having an index corresponding to k, and a second data bit immediately successive to the first data bit.

15. The product of claim 13, wherein the instructions, when executed, cause the STA to modulate the pair of consecutive data bits to the k-th constellation point in the first spatial stream as follows:

$$\frac{1}{\sqrt{2}}((2c_0 - 1) + j(2c_1 - 1))$$

and to modulate the pair of consecutive data bits to the P(k)-th constellation point in the second spatial stream as follows:

$$\frac{1}{\sqrt{2}}((2c_0 - 1) - j(2c_1 - 1))$$

wherein $c_0$ denotes a first data bit of the pair of consecutive data bits, and $c_1$ denotes a second data bit of the pair of consecutive data bits.

16. The product of claim 12, wherein the instructions, when executed, cause the STA to modulate another data bit sequence into a third constellation point in the first spatial stream and a fourth constellation point in the second spatial stream, the third constellation point comprises a P(k)-th constellation point in the first spatial stream, the fourth constellation point comprises a k-th constellation point in the second stream.

17. The product of claim 12, wherein P(k) is a sum of k and half of a number of subcarriers.

18. The product of claim 12, wherein P(k) is a mapping of k according to a Static Tone Pairing (STP).

19. The product of claim 12, wherein P(k)=k+168.

20. The product of claim 12, wherein the instructions, when executed, cause the STA to generate the plurality of data bit sequences according to a Phase Shift Keying (PSK) modulation.

21. An apparatus comprising:

means for modulating at a wireless communication station (STA) a plurality of data bit sequences into a plurality of constellation points in first and second spatial streams according to a Dual Carrier Modulation (DCM), a data bit sequence of the plurality of data bit sequences comprises a sequence of a plurality of data bits, modulating the plurality of data bit sequences comprises modulating the sequence of the plurality of data bits into a first constellation point in the first spatial stream and a second constellation point in the second spatial stream, the second constellation point is a complex conjugate of the first constellation point, the first constellation point comprises a k-th constellation point in the first spatial stream, the second constellation point comprises a P(k)-th constellation point in the second spatial stream, wherein P(k) is a predefined function of k; and means for causing the STA to transmit an Orthogonal Frequency Division Multiplexing (OFDM) transmission over a wireless communication channel in a frequency band above 45 Gigahertz (GHz), the OFDM transmission based on the plurality of constellation points in the first and second spatial streams.

22. The apparatus of claim 21 comprising means for causing the STA to modulate another data bit sequence into a third constellation point in the first spatial stream and a fourth constellation point in the second spatial stream, the third constellation point comprises a P(k)-th constellation point in the first spatial stream, the fourth constellation point comprises a k-th constellation point in the second stream.

23. The apparatus of claim 21, wherein P(k) is a sum of k and half of a number of subcarriers.

* * * * *